UNITED STATES PATENT OFFICE.

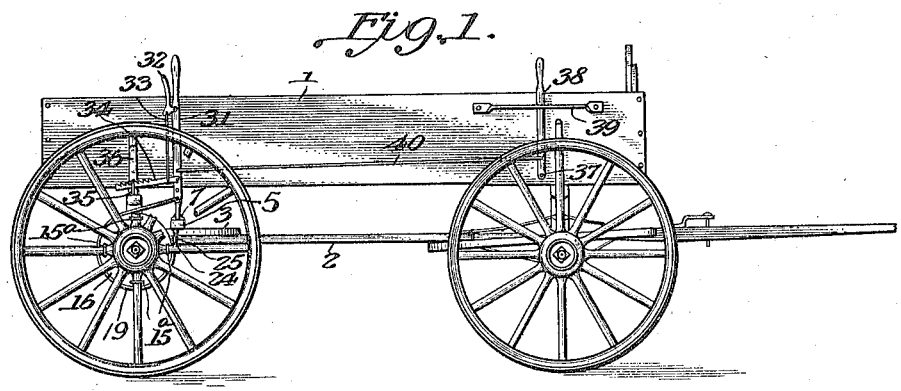

ZACHERIA E. MAYS, OF MONROE, VIRGINIA, ASSIGNOR OF ONE-HALF TO WILLIAM KINCKLE ALLEN, OF AMHERST, VIRGINIA.

SELF-LOCKING BRAKE FOR WAGONS.

1,237,799.  Specification of Letters Patent.  Patented Aug. 21, 1917.

Application filed October 22, 1915. Serial No. 57,234.

*To all whom it may concern:*

Be it known that I, ZACHERIA E. MAYS, a citizen of the United States, residing at Monroe, in the county of Amherst and State of Virginia, have invented certain new and useful Improvements in Self-Locking Brakes for Wagons, of which the following is a specification.

The invention relates to the art of wagon brakes, and more particularly to that class of wagon brakes known as frictional drum brakes.

The invention has for its object to facilitate the braking of the hind wheels of a vehicle, either from the rear of the wagon, or by means of a hand operating lever at the forward end of the vehicle and within easy reach of the driver.

A further object is to provide a braking mechanism, wherein it will be possible for the driver, if he so desires, to adjust the same so that both or either wheel may be operated.

A further object is to provide a braking mechanism wherein a fine adjustment between the brake bands and drums may be attained and also resilient means, whereby under normal conditions the brake bands are kept out of engagement with the brake drums.

Other objects will appear and be better understood from the embodiment of the invention of which the following is a specification, reference being had to the accompanying drawing forming a part thereof, in which:—

Figure 1 is a side elevation of a wagon showing the brake applied thereto and in operation.

Fig. 2, is a top plan view of the rear running gear of a wagon, showing the brake as applied to the rear wheels.

Fig. 3 is an enlarged side elevation of the brake.

Referring to the drawing, 1 designates a conventional form of wagon, having a conventional form of running gear 2. Secured to the rear hounds 3, by means of bolts 4 and in parallelism with the rear axle is a cross bar 5, the ends 6 of which terminating in juxtaposition to the rear wheels of the vehicle. Rockably mounted in bearings 7 of the cross bar 5 is a rock shaft 8, which terminates at its ends 9 and 10 in upwardly extending arms 11 and 12, the arm 12 is provided with an outwardly extending projection or lug 13, the purpose of which will presently appear. Mounted upon the wheels 14 and secured to the spokes 15 thereof, by means of the U bolts 15$^a$ are brake drums 16 and 17, and extending around said drums and normally held out of engagement therewith, by means of the spring arms 18, are brake bands 19 and 20, said spring arms 18 have their ends 21 rigidly secured at 22 to the brake bands, while their other ends are rigidly secured at 23 to the axles of the rear running gear.

The brake bands 19 and 20 have their ends 24 secured at 25 to the ends 6 of the cross bar 5, while their ends 26 are secured at 27 to the adjusting bolts 28, which extend through apertures in the arms 11 and 12. Threaded upon the adjusting bolts 28 and on each side of the arms are nuts 29, by the adjustment of which either brake band may be adjusted in relation to the drum, or so adjusted that either brake may be operated or both.

Secured to the upwardly extending arm 11, by means of bolts 30, is a lever 31, having a hand grip 32 adapted to actuate by means of a connecting rod 33 the toothed bar 34, the teeth of which are adapted to engage a detent plate 35, carried by the standard 36 of the rear running gear. Thus it will be seen that by moving the lever 31 in the direction of the arrow *a* the brakes on both rear wheels may be permanently thrown into operation, or if the brake bands are adjusted to operate only one brake, that brake only will be permanently thrown into operation.

Pivotally secured at 37 to the forward end of the wagon body is a lever 38, having a guide yoke 39. Connecting said lever 38 and lever 31 is a connecting rod 40. Thus it will be seen that under ordinary conditions the rear brakes may be operated from the front of the vehicle without permanently locking the same.

Thus having described my invention what I claim and desire to secure by Letters Patent is:—

In a vehicle-brake, the combination with brake drums mounted upon the rear wheels of a vehicle, brake bands surrounding the drums and normally held out of engagement with the periphery of said drums, means for forcing the brake bands into engagement with the drums comprising a rock bar having upstanding arms adjustably connected to one end of said brake bands, the other ends of said brake bands being attached to the rear rigid running gear of the vehicle and tangential to the forward edge of said drums thereby causing the strain to be exerted upon the running gear in a vertical direction and uniformly on both sides of said running gear, lever means attached to one of said upstanding arms and having means whereby the brake can be permanently set by grasping the lever handle and rack engaging grip and forcing the same forwardly, said grip when actuated raising a toothed rack into engagement with a detent plate over which its teeth ratchet to the desired position and means whereby upon a forward movement of said lever the toothed bar will drop by gravity out of engagement with the detent plate.

In testimony whereof I affix my signature in the presence of two witnesses.

ZACHERIA E. MAYS.

Witnesses:
WM. KINCKLE ALLEN,
JESSIE BURFORD.

Copies of this patent may be obtained for five cents each, by addressing the "Commissioner of Patents, Washington, D. C."